United States Patent [19]
Ishikawa et al.

[11] Patent Number: 5,647,753
[45] Date of Patent: Jul. 15, 1997

[54] ELECTRICAL CONNECTION DEVICE BETWEEN HANDLE AND STEERING COLUMN

[75] Inventors: Satoshi Ishikawa; Nobuhiko Suzuki; Tohru Ikumi, all of Shizuoka-ken, Japan

[73] Assignee: Yazaki Corporation, Tokyo, Japan

[21] Appl. No.: 517,689

[22] Filed: Aug. 22, 1995

[30] Foreign Application Priority Data

Aug. 26, 1994 [JP] Japan .................................. 6-202251

[51] Int. Cl.$^6$ .................................................. H01R 35/04
[52] U.S. Cl. ................................................ 439/689; 439/15
[58] Field of Search ........................................ 439/15, 164

[56] References Cited

U.S. PATENT DOCUMENTS 5,046,951  9/1991  Suzuki ........................................ 439/15
5,259,775  11/1993  Kubota et al. ........................... 439/164

FOREIGN PATENT DOCUMENTS 3-44888  4/1991  Japan .

*Primary Examiner*—P. Austin Bradley
*Assistant Examiner*—T. C. Patel
*Attorney, Agent, or Firm*—Finnegan, Henderson, Farabow, Garrett & Dunner, L.L.P.

[57] ABSTRACT

An electrical connection device between a handle and a steering column for a vehicle includes a rotor, a housing for rotatably supporting the rotor and a flexible flat cable accommodated in an annular space defined by the rotor and the housing. The rotor is provided on an outer periphery thereof with a resinous C-ring of which frictional coefficient is smaller than that of the rotor. Consequently, when the rotor rotates with respect to the housing, the sliding resistance of the rotor rotating can be reduced by the C-ring, so that the sliding-noise can be reduced.

6 Claims, 5 Drawing Sheets

ELECTRICAL CONNECTION DEVICE BETWEEN HANDLE AND STEERING COLUMN

BACKGROUND OF THE INVENTION

The present invention relates to an electrical connection device between a handle and a steering column in a steering apparatus for a vehicle.

Recently, in connection with a progress of electronic control for an automobile, various kinds of switches have been provided in the handle, which may be called as "a steering wheel", in the steering apparatus for the automobile. Accordingly, there is raised a necessity of connecting these switches with electric cables on the steering column side by means of wiring. Since the handle for the vehicle are constructed so as to rotate in both directions of clockwise and counter-clockwise with several revolutions, a flexible flat cable (FFC) having a plurality of lead wires is generally used in an electrical connection device between the handle and the steering column. In the electrical connection device, the flexible flat cable is arranged between a rotor fixed to a handle axle and a housing fixed to the steering column, in either spiral wound condition or a "reversed" spiral wound condition that the cable is turned up on the half way.

Generally, the electrical connection device includes a cylindrical rotor to which a handle axle of the automobile is fixed and a housing which is fixed to the steering column to rotatably support the rotor at an outside portion thereof. The rotor consists of a first rotor element and a second rotor element to be assembled into the first rotor element from its axial direction. On the other hand, the housing consists of an upper cover and an undercover, both of which define an annular space for accommodating the above-mentioned FFC.

The second rotor element is provided with a flange which extends radially outward of the second rotor element. In assembling the electrical connection device, a cylindrical section of the second rotor element is inserted into a bore of the undercover from its downside and thereafter, the second rotor element is engaged with undercover since the flange of the second rotor element is brought into contact with a bottom surface of the undercover.

In this state, there is only remained a slight clearance between an outer periphery of the cylindrical section of the second rotor element and the an inner edge of the bore of the undercover. Therefore, when the first rotor element rotates together with the second rotor element, the outer periphery of the second rotor element and the inner edge of the bore come into contact with each other, providing sliding surfaces.

In spite of providing the sliding surfaces, the second rotor element and the undercover have been made of resinous materials of relatively large friction coefficient, such as PBT (polybutylene terephthalete), POM (polyoxymethylene) etc. Therefore, in order to reduce the friction coefficient between the sliding surfaces, grease is used thereby to reduce sliding-noise caused by a rotation of the rotor.

However, since this coating operation of grease on the sliding surfaces is complex and wasteful of time, an amount of grease coated is apt to be unequal depending on an operator. Consequently, it is expected that, in case that the amount of grease is too little, the sliding-noise would not be so reduced because of reduced lubrication effect. Conversely, in case that the amount is too much, the grease would flow out of the sliding surfaces thereby to stick to the other area where lubricating agent is not required.

SUMMARY OF THE INVENTION

It is therefore an object of the present invention to provide an electrical connection device which is capable of reducing the sliding-noise generated on the sliding surfaces between the rotor and the housing without requiring complex coating-operation for the operator.

The object of the invention described above can be accomplished by an electrical connection device between a handle and a steering column for a vehicle, the device comprising:

a rotor into which an axle of the handle is fixed, a housing arranged about the rotor and fixed to the steering column to rotatably support the rotor, the housing defining an annular space therein together with the rotor, and a flexible flat cable accommodated in the annular space to move following both of rotations of the rotor in reverse-directions, the flexible flat cable having one end connected to the housing and another end connected to the rotor thereby to connect the housing with the rotor electrically, wherein the rotor is provided on an outer periphery thereof facing an inner edge of the housing with a resinous layer of which frictional coefficient is smaller than that of the rotor.

With the arrangement mentioned above, the sliding resistance of the rotor in rotating can be reduced by a provision of the resinous layer thereby to smooth the rotation of the rotor.

In the present invention, preferably, the rotor consists of a first rotor element to which the another end of the flat cable is connected, and a second rotor element which is engaged into the first rotor element from axial outside of the housing so that an axial end of the second rotor element is exposed outside of the housing and the resinous layer is arranged on an outer periphery of the second rotor element.

More preferably, the resinous layer is constituted by a ring which is rotatably arranged to the rotor and provided in the circumferential direction with a gap. In this case, owing to the gap, it is possible to prevent the ring from being broken by expansion or shrinking of the rotor in the circumferential direction, which is caused by change in temperature.

Alternatively, in case that there is no need of considering the change in temperature, the resinous layer may be constituted by a ring with no gap, which is rotatably arranged to the rotor.

In the present invention, it is preferable that the resinous layer is arranged integrally with the rotor. In such a case, an operation to fit the ring to the rotor can be excluded thereby to facilitate the assembling-work of the device.

These and other objects and features of the present invention will become more fully apparent from the following description and appended claims taken in conjunction with the accompanying drawings.

DESCRIPTION OF THE PREFERRED EMBODIMENT

One embodiment of the present invention is now described with reference to the drawings.

Figure 1:
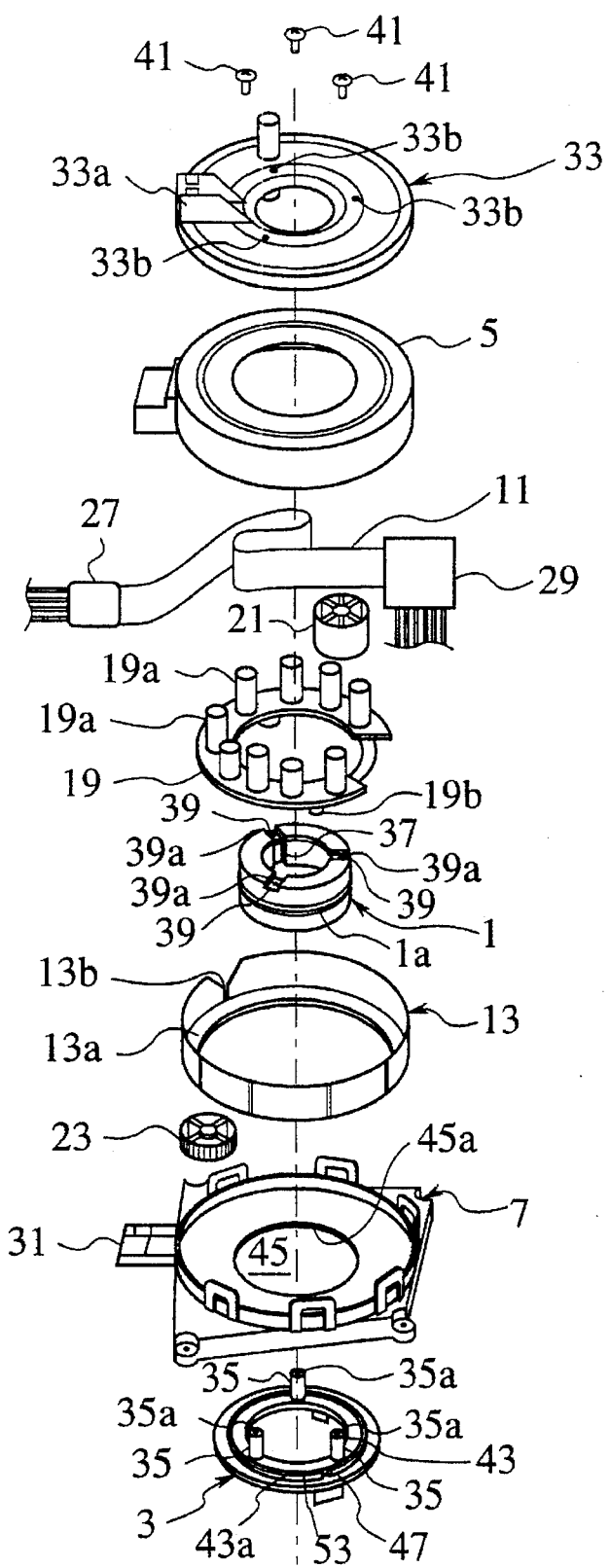
FIG. 1 is a perspective view showing a disassembled electrical connection device in accordance with an embodiment of the present invention.
Figure 2:
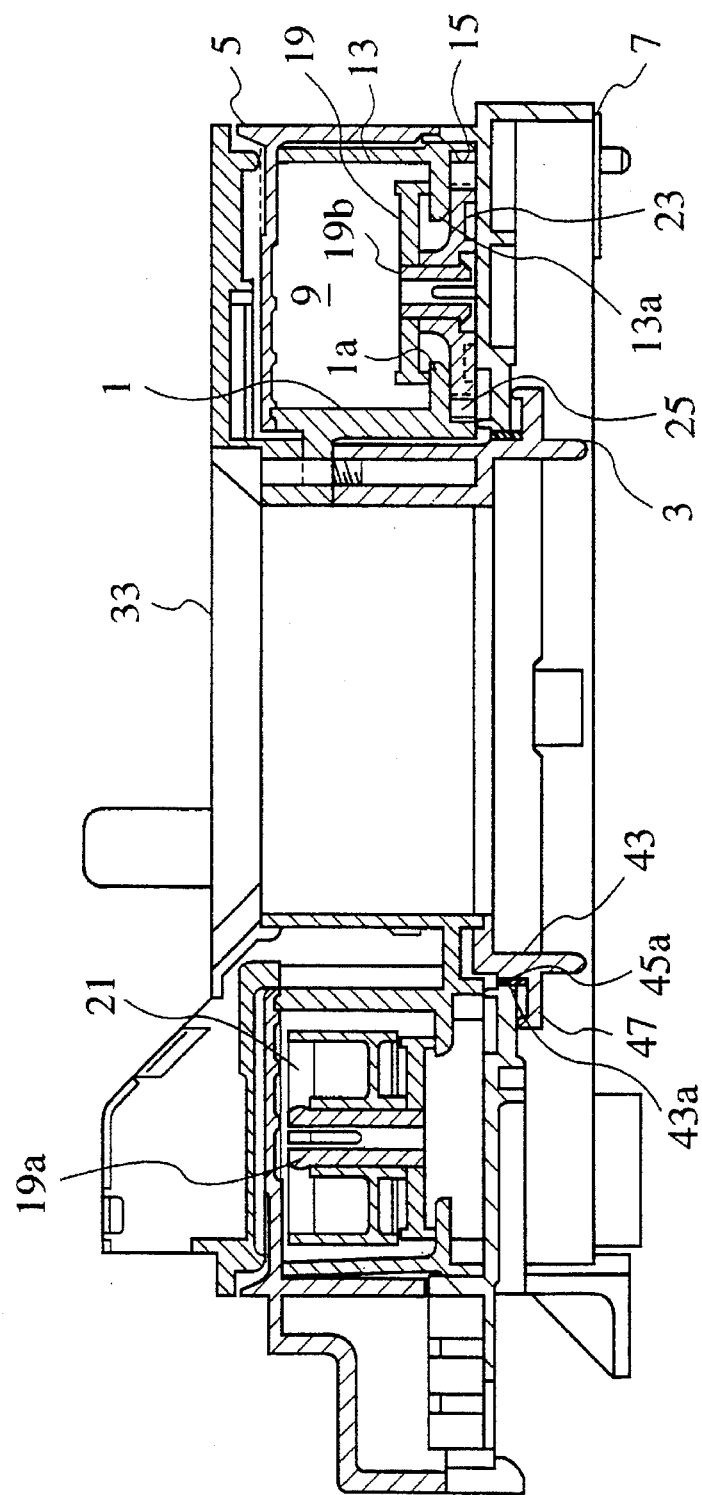
FIG. 2 is a cross-sectional view of the electrical connection device of FIG. 1 under the assembled condition.

FIG. 1 is a perspective view showing a disassembled electrical connection device in accordance with an embodiment of the present invention and FIG. 2 is a cross-sectional view thereof in its assembled condition.

The electrical connection device includes a cylindrical rotor to which a not-shown handle axle of the automobile is fixed. The cylindrical rotor consists of a first rotor element 1 and a second rotor element 8. The device further includes a cylindrical housing secured to a not-shown steering column to rotatably support the rotor at its outer periphery. The cylindrical housing consists of an upper cover 5 and an undercover 7 which is to be assembled with the upper cover 5.

Accommodated in the annular space 9 between the rotor and the cylindrical housing is a flexible flat cable (FFC) 11 which serves to connect the handle with the steering column electrically.

Secured in the cylindrical housing defined by the upper cover 5 and the undercover 7 is an internal gear 13 in which the FFC 11 is accommodated. The internal gear 13 is provided on a lower inner surface thereof with a gear section 15. A carrier 19 is rotatably mounted in the space 9 between a lower flange 18a of the internal gear 13 and a lower flange 1a of the first rotor element 1. The carrier 19 has a plurality of pins 19a which project upward and on which a plurality of guide rollers 21 for guiding the FFC 11 are rotatably mounted. On the other hand, rotatably mounted on three pins 19b projecting downward of the carrier 19 are respective planet gears 23 which mesh with the gear section 15 of the internal gear 13. The planet gears 23 also mesh with a gear section 25 formed on the lower and outer periphery of the first rotor element 1. Therefore, by the rotation of the planet gears 23 caused by a rotation of the first rotor element 1, the carrier 19 rotates with respect to the first rotor element 1 due to a revolution of the planet gears 23 in a predetermined reduction ratio.

Figure 3:
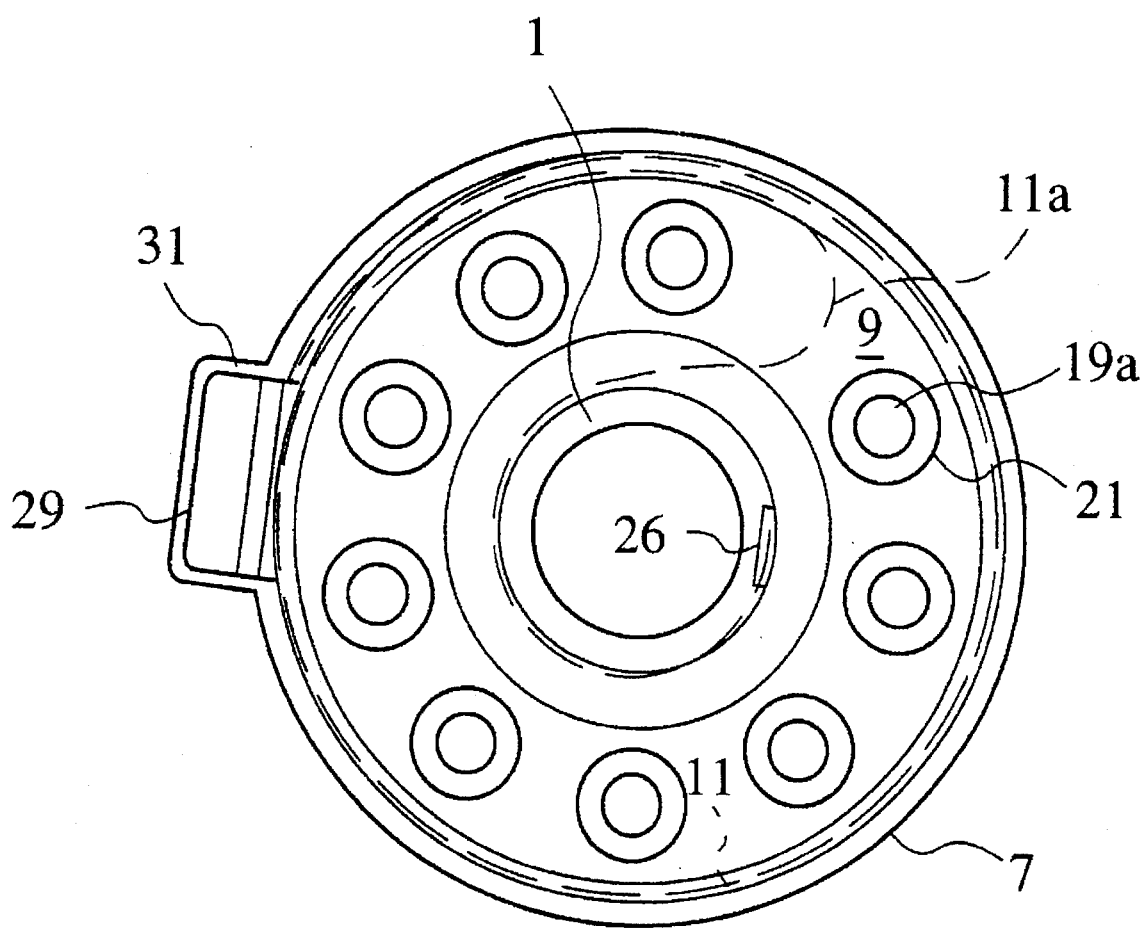
FIG. 3 is a plan view of FIG. 2 showing a flexible flat cable accommodated in a housing of the electrical connection device.

FIG. 3 is a plan view of the undercover 7 showing the FFC 11 with a broken line, which is accommodated in the housing. As shown in the figure, the FFC 11 has an terminal on its inner-periphery side, which is fixed to a fixed part 26 of the first rotor element 1 and to which a connector 27 is attached. After being wound on the outer periphery of the first rotor element 1, the FCC 11 extending from the connector 27 passes about one of the guide rollers 21 optionally thereby forming a curved section 11a. Thereafter, the FCC 11 is wound on the inner periphery of the internal gear 13 in an opposite direction of the above direction on the outer periphery of the first rotor element 1. Thus, the FCC 11 is pulled out of the internal gear 11 through a notch 13b, so that the connector 29 attached to a terminal of the FCC 11 is fixed to a swelling part 31 of the undercover 7.

On the upper cover 5, a rotating cover 33 is overlaid to rotate together with the first and second rotor elements 1 and 3, so that the connector 27 is fixed to a fixed section 33a provided on the rotating cover 33. The cover 33 has three holes 33b formed thereon and correspondingly, the second rotor element 3 is provided on an upper surface thereof with three bosses 35 to be respectively aligned with the holes 33b. Each boss 35 has a tapped hole 35a formed at its top end. In assembling, the respective bosses 35 are inserted into grooves 37 passing through the first rotor element 1 and brought into contact with an under surface of a flange part 39 of the first rotor element 1. The flange part 39 is provided with three through-holes 39a. Upon inserting three screws 41 into the holes 33b of the rotating cover 33 and the through-holes 39a of the first rotor element 1, the rotor are fixed to the housing by screwing the screws 41 into the tapped holes 35a of the second rotor element 3.

The FFC 11 has a length enough to follow several rotation of the handle. Therefore, when the first rotor element 1 is rotated in the clockwise direction of FIG. 3, a section of the FFC 11 wound round the rotor element 1 is loosen and then wound about the inner periphery of the internal gear 13. On the contrary, when the first rotor element 1 is rotated in the counter-clockwise direction of FIG. 3, a section of the FFC 11 wound about the inner periphery of the internal gear 13 is loosen and then wound round the outer periphery of the first rotor element 1. During the above rotations of the rotor element 1, the FCC 11 can move smoothly at the same speed as that of the carrier 19 under a reduced frictional resistance due to the guide rollers 21 which are arranged between the rotor 1 and the internal gear 13 to rotate in contact with the FCC 11.

As shown in FIG. 1, the second rotor element 3 has a cylindrical section 43 to be inserted into a bore 45 of the undercover 7 from its downside. In assembling, since a flange 47 formed about the cylindrical section 43 comes into contact with a bottom surface of the undercover 7, the second rotor element 3 can be engaged with the undercover 7.

Figure 4:
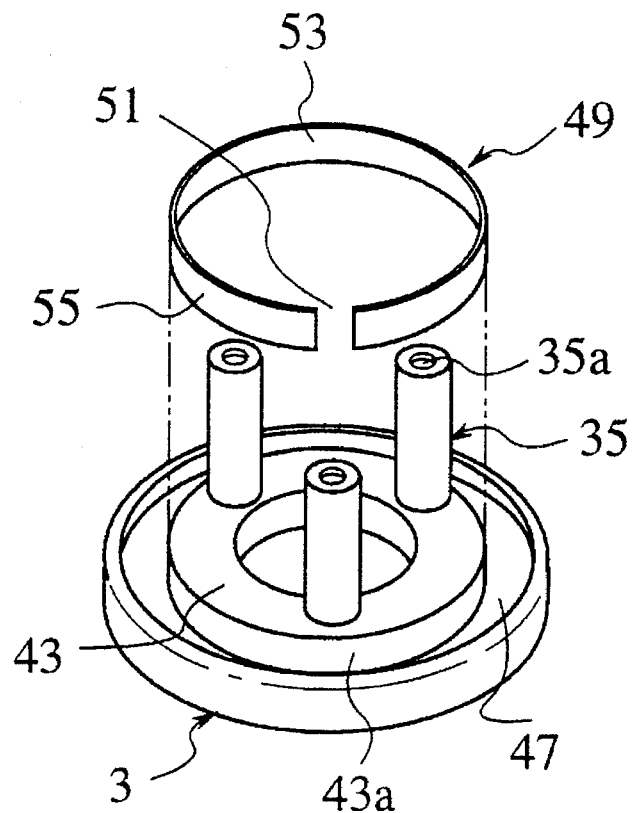
FIG. 4 is a perspective view showing a disassembled second rotor element in accordance with an embodiment of the present invention.

FIG. 4 is a perspective view of the second rotor element 3 in accordance with the embodiment of the present invention. As shown in the figure, in the embodiment, a C-ring 49 as a resinous layer is engaged with an outer periphery 43a of the cylindrical section 43. The C-ring 49 is made of resinous material of a low frictional coefficient, such as "TEFLON", in comparison with that of the second rotor element 3. The C-ring 49 can be obtained by forming a strip of flat plate to be circular, leaving a gap 51 in the circumferential direction.

The inner diameter of the C-ring 49 is substantially equal to the outer diameter of the cylindrical section 43 of the second rotor element 3. The C-ring 49 is adapted to rotate with respect to the second rotor element 3 under condition that an inner surface 53 of the ring 49 comes into contact with the outer periphery 43a of the second rotor element 3 closely.

On the other hand, the outer diameter of the C-ring 49 is somewhat smaller than the inner diameter of the bore 45, so that a slight clearance is remained between an outer periphery 55 of the C-ring 49 and the an inner edge 45a of the bore 45.

The electrical connection device mentioned above operates as follows.

With the revolution of the handle, the first and second rotor elements i and 3 rotate in the clockwise and counter-clockwise directions. Particularly, when the second rotor element 3 rotates, the C-ring 49 fitted to the second rotor element 3 slides on the cylindrical section 43 under a reduced frictional coefficient between the outer periphery 55 and the inner edge 45a of the undercover 7 owing to the ring's rolling effect. Consequently, the sliding-noise caused by the rotation of the rotor with respect to the undercover 7 can be reduced. Of course, the above-mentioned noise-reduction does not require the conventional coating-operation of grease onto the sliding surfaces.

In addition, since the C-ring 49 itself is made of less frictional resistance, it is possible to decrease a clearance defined between the C-ring 49 and the inner edge 45a of the undercover 7, whereby the rattle-noise in rotation of the rotor can be reduced. Further, even if the second rotor element 3 expands or shrinks in the diametrical direction by a change in temperature, no crack would be produced in the C-ring 49 because of a provision of the gap 51, so that high-reliability in the device can be realized.

Figure 5:
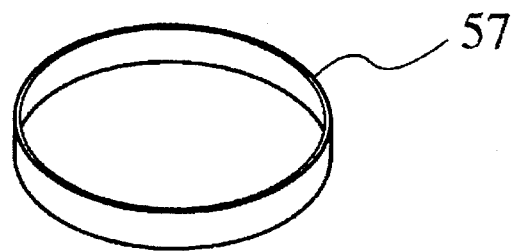
FIG. 5 is a perspective view showing a modification of a ring of FIG. 4.

Note, in case that there is no need of considering the above-mentioned change in temperature, the C-ring 49 may be replaced with an O-ring 57 as shown in FIG. 5, which is to be rotatably engaged with the cylindrical section 43 of the undercover 75. Needless to say, the O-ring 57 is also made of resinous material of less frictional resistance, such as "TEFLON", as similar to the above-mentioned C-ring 49. Although the C-ring 49 and the O-ring 57 are rotatably arranged with respect to the undercover 7 in the embodiment, such rings may be fixed to the undercover 7 integrally in the modification.

Figure 6:
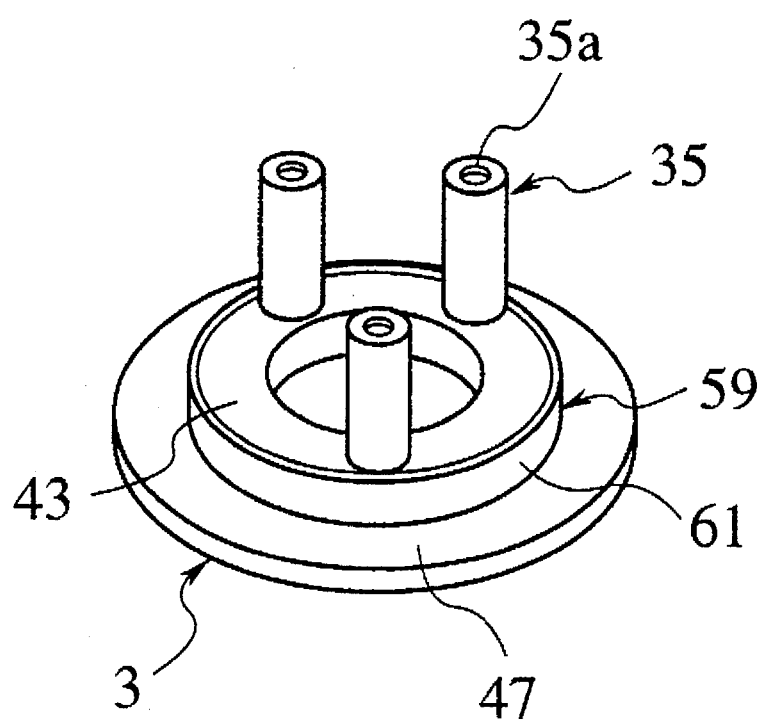
FIG. 6 is a perspective view showing an assembled second rotor element of the present electrical connection device in accordance with another embodiment of the present invention.

FIG. 6 shows another embodiment of the invention. In the embodiment, the second rotor element 3 is provided on the outer periphery 43a of the cylindrical section 43 with an annular layer 59 which can be obtained by the "double-molding" method and which is made of resinous material having a low frictional resistance such as "TEFLON". The outer diameter of the layer 59 is somewhat smaller than the inner diameter of the bore 45 of the undercover 7 shown in FIG. 1, so that a slight clearance is remained between an outer periphery 61 of the layer 59 and the inner edge 45a of the bore 45.

Also in this embodiment, since the sliding surface of the second rotor element 8 against the inner edge 45a of the bore 45 of the undercover 7 is constituted by the resinous layer 59 of low frictional coefficient, it is possible to reduce a level of sliding-noise generated between the second rotor element 3 and the undercover 7 when the rotor rotates. Owing to low frictional resistance of the resinous layer 59, a clearance thereof against the inner edge 45a of the undercover 7 can be further decreased in comparison with that of the conventional device thereby to reduce the rattle-noise in rotation of the rotor. Additionally, according to the embodiment, since it is not required such a fitting operation of the C-ring 49 and the O-ring 57 in the previous embodiment, the assembling work of the device can be simplified.

Finally, it will be understood by those skilled in the art that the forgoing description of the preferred embodiments of the disclosed structure, and that various changes and modifications may be made to the present invention without departing from the spirit and scope thereof.

What is claimed is:

1. An electrical connection device for use between a steering wheel and a steering column for a vehicle, said device comprising:

a rotor into which an axle of said steering wheel is fixed, a housing arranged about said rotor and fixed to said steering column to rotatably support said rotor, said housing defining an annular space therein together with said rotor, and a flexible flat cable accommodated in said annular space to move following both of rotations of said rotor in reverse-directions, said flexible flat cable having one end connected to said housing and another end connected to said rotor thereby to connect said housing with said rotor electrically, wherein said rotor is provided on an outer periphery thereof facing an inner edge of said housing with a resinous layer whose frictional coefficient is smaller than that of said rotor.

2. An electrical connection device as claimed in claim 1 or 2, wherein said resinous layer is constituted by a ring which is rotatably arranged to said rotor and provided in the circumferential direction with a gap.

3. An electrical connection device as claimed in claim 1 or 2, wherein said resinous layer is constituted by a ring with no gap, which is rotatably arranged to said rotor.

4. An electrical connection device as claimed in claim 1 or 2, wherein said resinous layer is arranged integrally with said rotor.

5. An electrical connection device as claimed in claim 1, wherein said rotor consists of a first rotor element to which said another end of said flat cable is connected, and a second rotor element which is engaged into said first rotor element from axial outside of said housing so that an axial end of said second rotor element is exposed outside of said housing, and wherein said resinous layer is arranged on an outer periphery of said second rotor element.

6. An electrical connection device as claimed in claim 5, wherein said resinous layer is made of polytetrafluoroethylene.

* * * * *